Oct. 12, 1937.  A. T. KUNKEL  2,095,668
WEATHER STRIP
Original Filed Oct. 9, 1933
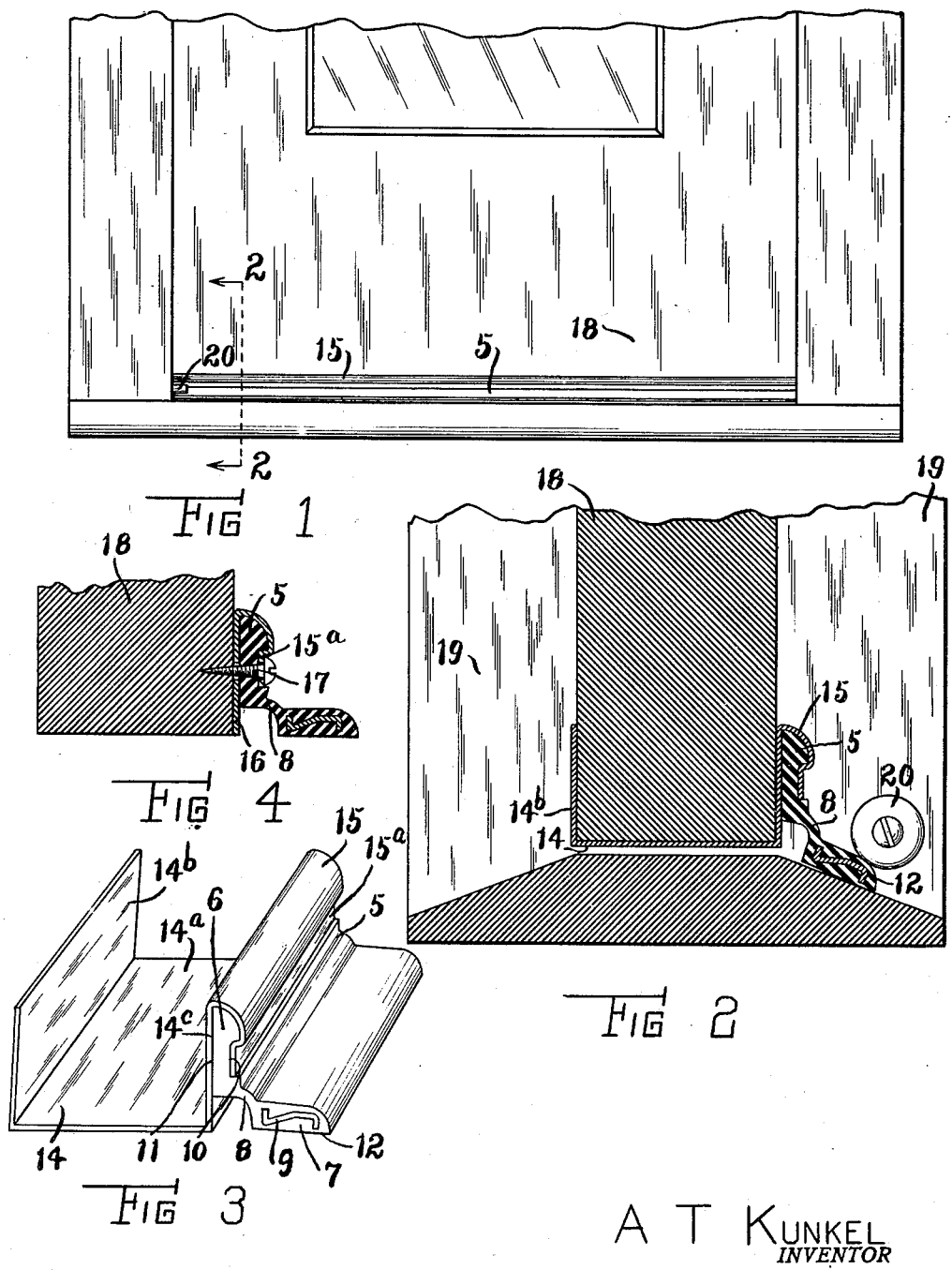

Patented Oct. 12, 1937

2,095,668

UNITED STATES PATENT OFFICE 2,095,668

WEATHER STRIP

Aloysius T. Kunkel, Akron, Ohio

Application October 9, 1933, Serial No. 692,742
Renewed August 21, 1936

4 Claims. (Cl. 20—67)

This invention relates to weather strips and to improvements in means for securing the same to a door or similar structure.

Objects of the invention are to provide a weather strip of simple construction which may be manufactured at a low cost; which can be quickly and conveniently attached to a door and securely retained thereon, and, which when so attached will be very efficient in sealing the opening between the door and threshold, floor or other adjacent frame element.

A particular object is to provide a rubber weather strip having new and improved means for holding the same in an operative position on a door.

A further object is to provide a weather strip composed of one piece of elastic rubber or similar material, having a sealing portion or attaching portion and a relatively thin resilient connecting portion and to provide new and improved means for maintaining the attaching portion in a rigid position and for securing the same to a door.

In the accompanying drawing there is shown a preferred embodiment of the invention, it being understood that the invention is not confined to the particular form shown and that changes and modifications may be made which come within the scope of the invention as set forth in the appended claims.

In the drawing:—

Figure 1 is a front, elevational view of the lower portion of a door and door frame showing a strip constructed in accordance with this invention operatively attached thereto.

Figure 2 is a cross sectional view taken as indicated by the lines 2—2 of Figure 1, Figure 3 is a perspective view of a portion of a weather strip constructed in accordance with this invention, Figure 4 is a cross sectional view illustrating a modified form of the invention.

The invention will now be described with reference to the particular form illustrated in the drawing. The numeral 5 is used generally to denote a weather strip which is composed of one piece of elastic rubber.

The strip 5 includes an attaching portion 6, a sealing portion 7 and a relatively thin connecting portion 8. The sealing portion 7 is provided with a longitudinally extending reinforcing element 9 which is in the form of a modified Z-bar and is embedded therein with the sealing portion 7 vulcanized thereto.

The attaching portion 6 is provided on the forward face thereof with a longitudinally directed channel 10. The upper edge of the attaching portion 6 is rounded to meet the rear wall of the strip 11 at an acute angle. The rear wall 11 of the sealing portion 6 and the lower wall of the attaching portion 7 are normally positioned at substantially a right angle to each other.

The numeral 14 is used generally to denote a trough or channel member which is adapted to receive the lower edge portion of a door 18. The trough 14 is composed of relatively stiff sheet material having a flat bottom wall 14a and upright side walls 14b and 14c. While the walls 14b and 14c are substantially vertical, we prefer to incline one or both of said walls inwardly whereby the resiliency of said walls will serve to securely hold the trough 14 in an operative position on the door. The wall 11 of the weather strip 5 is positioned against the outer face of the wall 14c with the lower edge of the wall 11 spaced upwardly from the lower edge of the wall 14c.

The wall 14c is continued outwardly and downwardly around the upper edge of the attaching portion 6 to form a strip engaging portion 15. The contour of the portion 15 preferably conforms to the contour of the attaching portion 6 and the lower edge of the portion 15 is offset inwardly and is entered in the slot or cavity 10 to securely hold the strip 5 in the trough 14.

In the adaptation of the invention shown in Figure 4, the wall 16 similar to the wall 14c is employed and the walls 14a and 14b are omitted. The strip 16 is secured to the door 18 by means of the screws 17 which are entered through suitable openings in the portion 15a.

In operation, the trough 14 is positioned on the lower edge of the door as shown in Figures 1 and 2. The roller 20 is secured to the door jamb in a position where it will be engaged by the sealing portion 7 as the door is closed, thus forcing the portion 7 downwardly to a sealing portion as shown in Figure 2. It will be seen that the inherent nature of the portion 7 will cause it to instantly resume its normal position as soon as it is removed from the roller 20 by opening the door 18 and that the door can be freely opened and closed without interference from said sealing portion.

While the trough 14 is illustrated with solid side and bottom walls, it is understood that portions of the said walls may be omitted or strips or other members having the function of said walls may be substituted if desired.

The term "door" as used in the specification and claims is intended to include a window sash or any element for closing an opening and the word "threshold" is used in a broad sense and includes a door sill or any adjacent frame member or adjacent part below, above or along the side of the closure member.

Having thus illustrated my invention and described the same in detail, what I claim as new and desire to secure by Letters Patent is:—

1. In a weather strip, a channel member composed of relatively stiff sheet metal, said channel member having a bottom wall conforming in width to the thickness of a door and having upwardly projecting side walls, one of said side walls inclined inwardly whereby the side walls may be sprung outwardly to position the channel member on the lower portion of a door and the same held thereon without additional fastening means, the sheet metal being extended outwardly from the upper edge of one side wall to form a downwardly presented seat which extends longitudinally thereof and a sealing strip composed of one piece of rubber having a vertical portion secured in said seat; a relatively thin, longitudinally extending, flexible connecting portion projecting outwardly and downwardly from the lower edge of said vertical portion, a horizontal portion extended outwardly from said connecting portion and a reinforcing member embedded in said horizontal portion substantially as and for the purpose herein set forth.

2. In a weather strip, a channel member approximately equal in length to the width of a door and adapted to snugly receive the lower portion thereof without cutting or changing the door, said channel member having spring side walls adapted to grip and securely hold the same on a door without additional fastening means and a sealing strip secured to one wall of said channel member and projecting outwardly therefrom, the outwardly projecting portion of said sealing strip being depressible to seal the opening between the bottom of a door and adjacent structure.

3. In a weather strip, a channel member composed of relatively stiff sheet metal, said channel member having side walls extending longitudinally of the width of a door and adapted to grip the lower portion thereof to securely hold the same in a fixed position thereon without additional fastening means and a rubber sealing strip secured to one side of said channel member, said sealing strip having a horizontal portion projecting outwardly therefrom, said horizontal portion being normally positioned above the plane of the door threshold and being depressible against said threshold and means for depressing said horizontal portion, said means being automatically operable by closing said door.

4. In a weather strip, a channel member composed of thin sheet metal having a bottom wall and upstanding side walls, the mouth of the channel in said member being normally of less width than the thickness of the door whereby the same when forced thereon will be held in a fixed position by the resiliency of the sheet metal and a rubber sealing strip secured to one side of said channel member; said sealing strip having an integrally formed vertical portion positioned flat against the upper portion of one side wall, a flexible connecting portion projecting from said vertical portion and a reinforced, horizontal portion projecting outwardly from said connecting portion.

ALOYSIUS T. KUNKEL.